United States Patent [19]

Bradley et al.

[11] Patent Number: 5,124,087

[45] Date of Patent: Jun. 23, 1992

[54] GAS AND LIQUID CONTACT BODY

[75] Inventors: Randall S. Bradley, Westminster; George R. Shriver, Sykesville, both of Md.

[73] Assignee: Evapco International, Inc., Wilmington, Del.

[21] Appl. No.: 592,767

[22] Filed: Oct. 4, 1990

[51] Int. Cl.$^5$ .............................................. B01F 3/04
[52] U.S. Cl. ................................................ 261/112.2
[58] Field of Search ................................... 261/112.2

[56] References Cited

U.S. PATENT DOCUMENTS

| | | | |
|---|---|---|---|
| D. 254,207 | 2/1980 | Holmberg | 261/112.2 |
| 1,847,216 | 3/1932 | Hubbard | 261/112.2 |
| 2,160,677 | 5/1939 | Romanoff | 261/112.2 |
| 2,793,017 | 5/1957 | Lake | 261/112 |
| 2,809,818 | 10/1957 | Munters | 261/24 |
| 2,986,379 | 5/1961 | Kramig, Jr. | 261/28 |
| 3,084,918 | 4/1963 | Kohl et al. | 261/112 |
| 3,099,696 | 7/1963 | Meek | 261/24 |
| 3,265,550 | 8/1966 | Lindqvist | 156/210 |
| 3,470,280 | 9/1969 | Munters et al. | 264/90 |
| 3,475,012 | 10/1969 | Britton et al. | 261/112 |
| 3,526,393 | 9/1970 | Meek | 261/102 |
| 3,540,702 | 11/1970 | Uyama | 261/112 |
| 3,599,943 | 8/1971 | Munters | 261/95 |
| 3,738,626 | 6/1973 | Norback | 261/112 |
| 3,862,280 | 1/1975 | Polovina | 261/112 |
| 4,099,928 | 7/1978 | Norback | 29/157.3 D |
| 4,296,050 | 10/1981 | Meier | 261/112 |
| 4,405,533 | 9/1983 | Norback et al. | 261/111 |
| 4,427,607 | 1/1984 | Korsell | 261/112 |
| 4,459,244 | 7/1984 | Norback | 261/112 |
| 4,579,694 | 1/1986 | Bradley, Jr. | 261/112 |
| 4,668,443 | 5/1987 | Rye | 261/112 |

Primary Examiner—Tim Miles
Attorney, Agent, or Firm—Panitch, Schwarze, Jacobs & Nadel

[57] ABSTRACT

This invention relates to a gas and liquid contact body comprising a plurality of adjacent, vertically oriented corrugated sheets where the corrugations extend downwardly at an oblique angle to the horizontal. The bottom portion of the corrugations is cut on an oblique angle along the width of the sheet to form a beveled bottom edge having peaks and valleys along the width of the sheet. Adjacent sheets to the contact body are oriented in front-to-front and rear-to-rear orientation such that the corrugations of adjacent sheets cross at intersections of their apices, and bottom portions form a regular, ordered pattern when viewed from the bottom.

19 Claims, 3 Drawing Sheets

GAS AND LIQUID CONTACT BODY

BACKGROUND OF THE INVENTION

This invention relates to a gas and liquid contact body and to corrugated sheets of particular structure for forming a contact body. More especially, this invention relates to a contact body specifically adapted for use as heat transfer media in the form of wet deck fill in evaporative-type heat exchange apparatus, such as cooling towers, and particularly countercurrent evaporative heat exchangers, which are used for such applications as air conditioning and numerous other industrial processes. The contact bodies of the present invention are also useful as fill for gas scrubbers for reducing airborne pollution, media for trickling filters used in water and waste water treatment, and the like. This invention will be explained herein with reference to its primary intended use as wet deck fill in evaporative heat exchangers, such as cooling towers.

In usual cooling towers and other equipment comprising evaporative heat exchangers, water is distributed over the top of wet deck fill formed of contact bodies typically in the form of corrugated sheet material. As the water flows down the fill, a thin film of water is formed over the surface of the fill. A gas stream, usually air, passes over the water film on the fill to provide the evaporative cooling effect. Air flow is promoted with the use of a fan or centrifugal blower either from top to bottom (parallel flow), across the path of the water (crosscurrent) or in a direction opposite to the flow of the water, namely bottom to top (countercurrent).

The present invention may be used as fill in parallel flow, crosscurrent or countercurrent heat exchange apparatus, and is particularly effective when used in countercurrent applications.

The energy efficiency of an evaporative heat exchanger is determined in relation to its heat rejection capacity to its input energy, that is, the energy required to drive its blowers or fans for the air or other gas stream, as well as the pumps used to pump the water or other cooling liquid through the apparatus. Rising energy and building costs demand that heat exchange equipment manufacturers develop cooling towers and other equipment which is both more energy efficient and space efficient than prior art designs. In accordance with the present invention, efficiently and economically sized cooling towers or other evaporative heat exchangers are also more energy efficient. Thus, testing has shown that wet deck fill made of contact bodies using the corrugated contact sheets of the present invention has surprisingly lower pressure drop than fill using contact bodies made of corrugated contact sheets of the prior art. By lowering the pressure drop while maintaining excellent thermal performance, the same amount of air can be passed through the fill at lower fan or blower horsepower, allowing more economical thermal performance and energy efficiency for any fan system. Alternatively, if it is desired to use the same fan system as in prior art designs, wet deck fill made according to the present invention will perform at higher water loads and may be stacked higher within a heat exchanger to efficiently move air through the fill. This results in smaller towers of equal thermal capacity, providing the desired benefit of a cooling tower or other evaporative heat exchanger requiring less building space which can be manufactured more economically than prior art designs.

Contact bodies made from corrugated contact sheets of the present invention have excellent structural integrity and are easy to assemble from the contact sheets which can be made economically and efficiently. With the present invention, wet deck fill can be constructed to be placed in standard cooling towers on standard cooling tower fill supports. Contact bodies of the present invention can be stacked directly on each other to create layered wet deck fills without special intermediate supporting members which impede air flow and raise the pressure drop of the wet deck fill. Other advantages and benefits of the present invention will be set forth hereinafter following the description of the preferred embodiments of the present invention.

The prior art is crowded with various types of contact bodies assembled from contact sheets having different types and shapes of corrugations and various configurations.

Representative of prior art contact bodies which may be deemed to be relevant to the present invention are the following U.S. patents.

U.S. Pat. No. 2,809,818 discloses in the paragraph bridging columns 4 and 5 that the contact body has lower edges forming a series of successive notches or serrations terminating in depending points 56, such that when viewed from the front (right side of the drawing), the lower edge looks like a series of "W"s extending over several vertical corrugations. The serrated lower edge is to prevent water dams from forming which would result in a high pressure drop. The contact body comprises alternating flat and corrugated sheets, where the corrugations are oriented vertically.

U.S. Pat. No. 2,986,379 discloses contact bodies used as a heat exchange core or wet deck fill made of sheets having vertical corrugations with serrated lower edges forming a series of "W"s as illustrated in FIGS. 4, 5 and 12 of the reference. The purpose of the serrated lower edges, as described in column 4, lines 30-34, is to increase the efficiency of the blower by facilitating discharge of water from the wet deck fill passageways. It appears that the corrugated sheets are sandwiched between intermediate planar sheets as generally illustrated in FIG. 2 of the reference. This reference also discloses that the sheets used to make the wet deck fill are of asbestos paper impregnated with a phenolic resin wherein the paper fibers preferably extend at right angles to the vertical passageways. The fibers are disclosed as functioning very effectively to diffuse water, to slightly impede its flow and to prevent the formation of any streams or rivulets (column 3, line 67 through column 4, line 11).

U.S. Pat. No. 3,084,918 discloses several embodiments of contact bodies characterized by alternating adjacent sheets forming the contact bodies having a bottom edge arranged in a staggered position with respect to the height of the adjacent sheet. The embodiments include either vertically corrugated sheets in contact with like vertically corrugated sheets or vertically corrugated sheets in contact with alternating flat sheets. The face-to-face adjacent corrugated sheets have their bottom edges at different elevations to prevent water collection at the bottom edges. The bottom edges of the flat and/or corrugated sheets may also be notched for the purpose of minimizing water collection at the bottom terminal edges. When viewed from the top or bottom, the sheets forming the contact body appear to form a regular geometric shape which extends straight through the contact body from the top to the bottom.

U.S. Pat. No. 3,099,696 discloses a gas and liquid contact body for use in a cooling tower made of a plurality of alternating sheets. One of the series of alternating sheets is a vertically corrugated sheet, and the other sheet of the series is planar. At column 2, lines 36-41, it is disclosed that the lower edges of the layers are cut off in an inclined manner along cutting surfaces 18 (FIG. 1 of the reference) to facilitate flowing off of the water and, thus, prevent the cross sectional area of the channels to be bridged over and clogged at the lower end by drops of water.

U.S. Pat. No. 3,265,550 discloses a contact body or packing element for use in a cooling tower or the like. Although the drawings and most of the description relate to a contact body having alternating planar and vertically corrugated sheets, the last paragraph of column 4 states that all of the sheets may be corrugated. The bottom edges of all sheets are cut to form serrations extending over several vertical corrugations, resulting in a series of drainage tips 16 (FIG. 1 of the reference) to assure continuous drainage.

U.S. Pat. No. 3,526,393 discloses a contact body for use in a cooling tower wherein the contact body has vertically oriented sheets having angled corrugations where the angle of corrugation is maintained throughout the height of the sheets. Adjacent sheets are aligned such that the corrugations criss-cross. The lower edges of the sheets are formed with projections or serrations 36 (FIGS. 2 and 3 of the reference) which are formed by cutting the bottom edges with a saw blade inclined relative to the edges at an acute angle and the sheets are formed as indicated in the last paragraph of column 2 with further reference to the manufacturing technique of U.S. Pat. No. 3,470,280. The resulting inclined surfaces 38 of the serrations at the bottom edges have an angle substantially less than 45°, such as from 15 to 30° coinciding with the ridges of the corrugations or folds so that the length of the points or projections can be substantially greater than the height of the corrugations. These relationships result in the prevention of a damming or bridge effect by the water over the space between the sheets which would create an increase of pressure counteracting the passage of air as explained at column 3, lines 8-30.

A contact body which has been available commercially from AB Carl Munters under the trademark "ASBESdek ®" comprises a plurality of sheets having angled corrugations and bottom edges which are cut obliquely as generally indicated in U.S. Pat. No. 3,526,393. The bottom edges of the contact sheets in the commercial embodiment are not aligned in a regular honeycomb-like pattern or any other regular geometric pattern. Rather, the bottom angled and pointed edges are randomly aligned, although some of the peaks and troughs of the bottom edges portions randomly contact each other. Neither the top edge nor the bottom edge of the "ASBESdek ®" contact body is oriented generally vertically such that the axis of the portions of the corrugations are perpendicular to a horizontal plane.

U.S. Pat. No. 3,540,702 discloses a contact body for cooling towers or the like made of adjacent sheets having horizontally oriented major corrugations. Minor corrugations are formed at oblique and opposite angles within each of the walls forming the major corrugations.

U.S. Pat. No. 3,599,943 discloses a contact body for use in a crosscurrent cooling tower in which air or other gas flows in a substantial horizontal direction across the path of the flow of water of other liquid in a substantially vertical direction. The contact body comprises a plurality of corrugated sheets wherein the corrugations of adjacent sheets extend diagonally criss-cross with respect to each other. The apices of the corrugations appear to be aligned at the left-hand side of the contact body as seen in FIGS. 1 and 3 of the reference.

U.S. Pat. No. 3,738,626 discloses a contact body for use in cooling towers or the like composed of corrugated layers in which the corrugations in adjacent layers form an angle relative to each other and extend at an inclined angle toward a lower liquid discharge edge. The bottom edges of the corrugated sheets forming the contact body are cut and arranged as illustrated in FIGS. 2 and 3 of the reference and as described in the Summary of the Invention and in the paragraph bridging columns 2 and 3 of the reference, to counteract collection of liquid due to the combined effect of surface tension and the upwardly streaming gas in a countercurrent-type heat exchanger.

U.S. Pat. No. 3,862,280 discloses a contact body for use in a crosscurrent or countercurrent cooling tower. The contact body comprises a plurality of corrugated sheets where the corrugations in adjacent sheets are disposed at an angle to each other. As illustrated in FIG. 1 of the reference, the bottom edges of the contact body used in a countercurrent cooling tower are serrated.

U.S. Pat. No. 4,296,050 discloses a contact body made of a plurality of corrugated plates or sheets which are provided with a plurality of apertures, as well as with a fine fluting on the walls of the corrugations. The flutings are disposed on both sides of the plates and are in the form of grooves which extend at an angle to the axis of the column which is of opposite sign to the angle of the corrugations relative to the axis of the column. The fine fluting on the plates improve liquid distribution over the plate surfaces by capillary action and channeling. The apertures interrupt or impede the channeling of water, thereby providing for a better water distribution over the sheets or plates forming the contact body. The lowermost series of substantially similarly constructed contact bodies or packing elements has a bottom configuration including serrations as best illustrated in FIG. 4 and explained at column 3, lines 12-17 of the reference.

U.S. Pat. Nos. 4,405,533 and 4,427,607 disclose contact bodies having particularly shaped top surfaces formed in a generally honeycomb pattern to allow for effective water spray between the sheets forming the contact bodies.

U.S. Pat. No. 4,459,244 discloses a contact body for use in cooling towers in which the contact body is comprised of a plurality of corrugated sheets where the corrugations of adjacent sheets criss-cross at an angle with respect to each other. The entire bottom surface of each contact body is cut at an angle across all of the corrugations. The bottom surface of the packing element appears to have an irregular honeycomb-type of pattern as illustrated in FIG. 4 of the reference. Since the bottom of the contact body forms a V-shape by virtue of obliquely cut sheet members forming the contact body, the water will flow along the edges of the obliquely cut members down to the surface of a central reinforcing plate 14 and thereafter down into a trough 16, rather than blocking the air passageways between adjacent sheets.

U.S. Pat. No. 4,668,443 discloses a contact body comprising vertically oriented sheets having angled corrugations which criss-cross each other in adjacent sheets. As illustrated in FIGS. 1 and 2 of the reference, the angled walls forming the corrugations include a plurality of minor corrugations or other surface treatments, such as raised and/or lowered bars 16 oriented generally perpendicular to the direction of the major face corrugations, as explained at column 11, lines 6–21 of the reference. In a commercial embodiment of the contact bodies made according to this patent by Brentwood Industries, Inc., each sheet of the contact body comprises a top portion and a bottom portion of corrugations having axes that are perpendicular, rather than at an oblique angle to the horizontal. Moreover, when viewed from the top and bottom of the contact body, the corrugated sheets are arranged in a regular, honeycomb-like pattern. In some embodiments, the edges of alternating sheets are staggered in height with respect to each adjacent sheet in a manner as generally illustrated in FIG. 3 of U.S. Pat. No. 3,084,918, described above. The bottom edges of the sheets forming the contact body are not cut or beveled to have an inclined, serrated configuration.

Compared to the prior art, the present invention provides a contact body which has surprisingly enhanced thermal performance and operational characteristics, based on the structure and orientation of the sheets used to make the contact bodies.

SUMMARY OF THE INVENTION

One aspect of the present invention comprises a gas and liquid contact body comprising a plurality of parallel and generally vertically oriented gas and liquid contact sheets, each sheet having a front face and a rear face, a top edge and a bottom edge, a major plane corresponding to the width and height of the sheet, a plurality of substantially parallel corrugations having apices alternating on the front and rear faces of the sheets, the apices being joined together by angled walls, the corrugations extending at an oblique angle to the horizontal, the sheet having a bottom portion of the corrugations adjacent the bottom edge, the bottom portion being cut on an oblique angle along the width of the sheet to form a beveled bottom edge, such that the beveled bottom edge has peaks and valleys along the width of the sheet when viewed from the front face or the rear face, adjacent sheets of the contact body being oriented such that the front face of one sheet is in contact with the front face of the next adjacent sheet and the rear face of the one sheet is adjacent to the rear face of the opposed next adjacent sheet and such that the corrugations of adjacent sheets cross at intersections of their apices, and the apices of the corrugations of the bottom portions of adjacent sheets are in contact with each other substantially completely along the width of each apex at the bottom edges of the sheets, whereby the bottom edges of the sheets comprising the contact body form regular, ordered patterns when viewed from the bottom of the contact body.

Another aspect of the present invention comprises a gas and liquid contact sheet comprising corrugations with apices formed on opposite faces of the sheet joined by angled walls, the corrugations being substantially parallel to each other and extending at an oblique angle to the horizontal, the walls of the corrugations containing a plurality of alternating concave and convex ribs extending completely from one apex to an opposing apex joined by the wall, the alternating ribs being generally transverse to the longitudinal axis of the corrugation and being separated from each other by generally planar portions of the wall of the corrugation.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
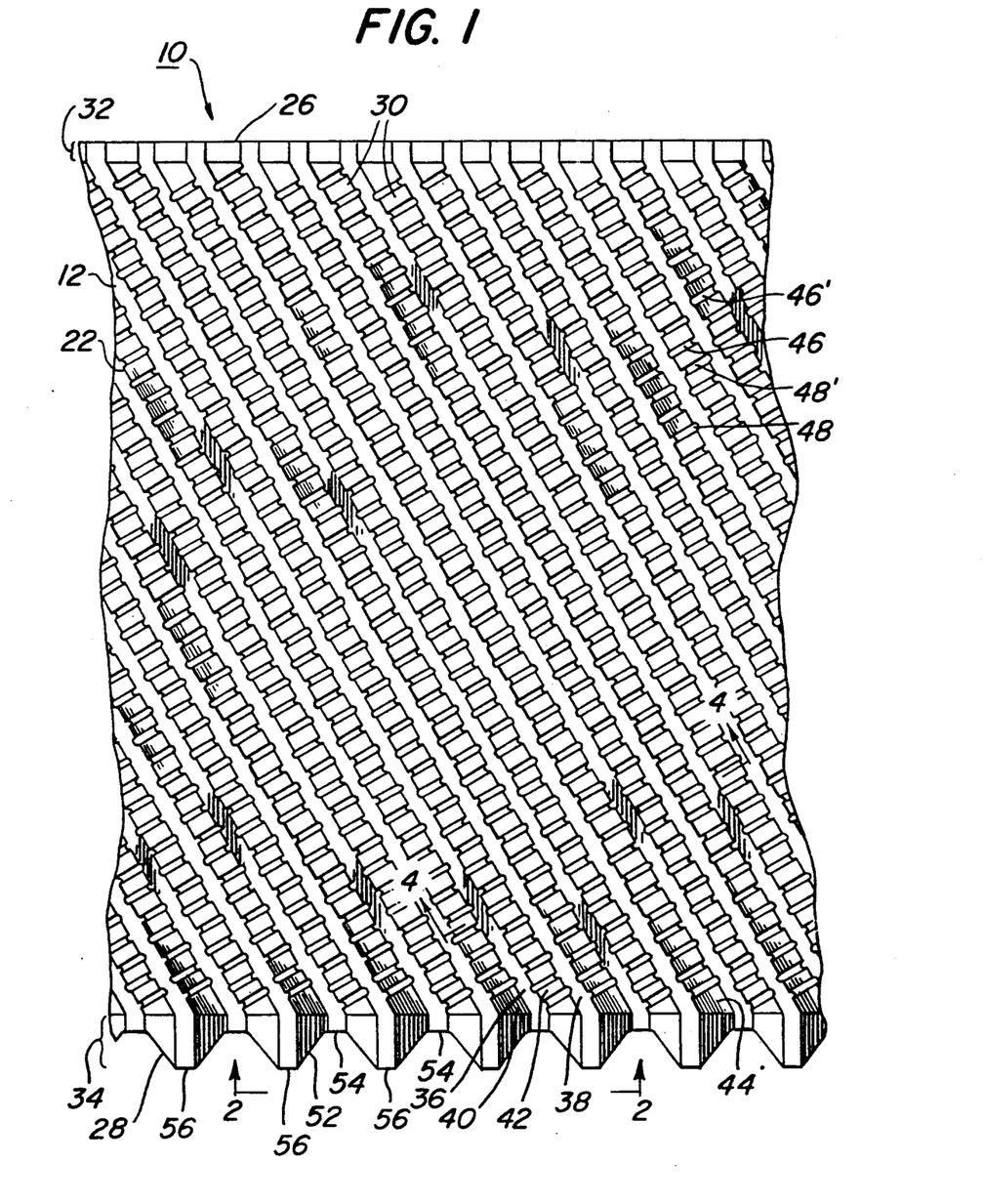
FIG. 1 is a front elevation view of a portion of a contact body made according to a preferred embodiment of the present invention.
Figure 2:
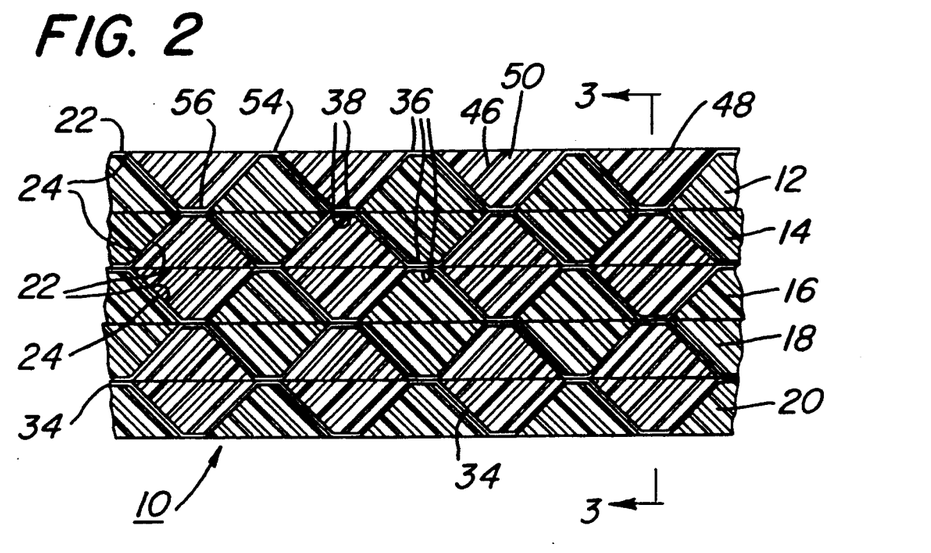
FIG. 2 is a bottom plan view of a portion of the contact body of the present invention, taken along lines 2—2 of FIG. 1, in which only five of many sheets typically comprising the contact body are illustrated.
Figure 3:
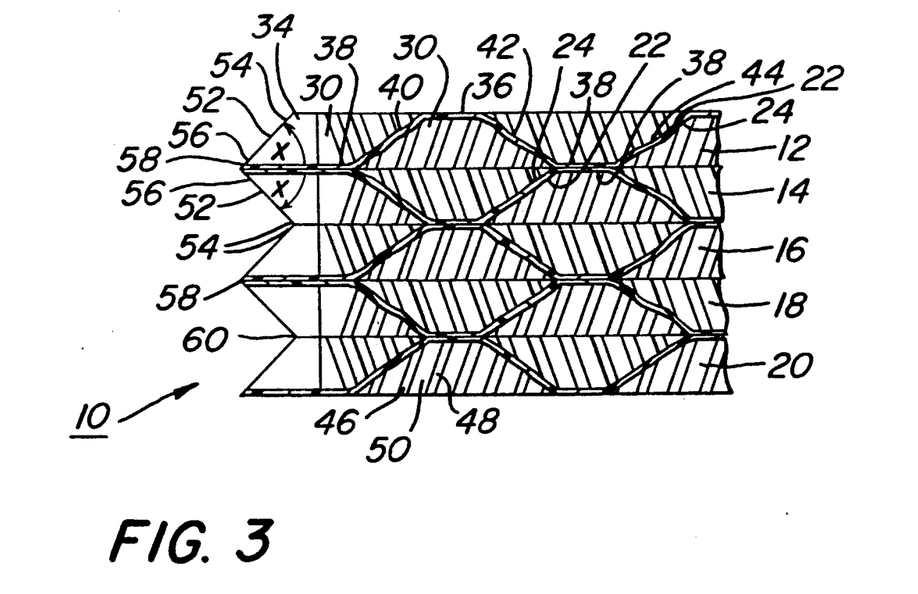
FIG. 3 is a cross-sectional view of a portion of a contact body according to the present invention taken along lines 3—3 of FIG. 2.

With reference to the drawings, wherein like numerals represent like elements throughout the several views, there is shown in FIG. 1 a portion of a presently preferred form of a contact body 10 according to the present invention. Since FIG. 1 is a front elevation view of the contact body, only the first sheet 12 of several contact sheets (hereinafter referred to as "sheets") 12, 14, 16, 18 and 20, illustrated in FIGS. 2 and 3, is visible in FIG. 1. Only five sheets are shown in FIGS. 2 and 3 for the sake of convenience, it being understood that contact body 10 can comprise any number of sheets necessary or desirable for any particular purpose.

For the purpose of explaining the details of the contact body made using the contact sheets according to the present invention, it will be described with reference to its preferred use as a wet deck fill in a countercurrent evaporative heat exchanger of the type illustrated in FIG. 1 of Bradley, Jr., U.S. Pat. No. 4,579,694. When contact body 10 is used for such a purpose, it is oriented within the evaporative heat exchanger in the direction illustrated in FIG. 1 hereof. Thus, the top and bottom of FIG. 1 represent the top and bottom, respectively, of a contact body in use.

The individual sheets used to make contact body 10 may be made from a variety of different materials, for example, thermoplastic material such as polyvinylchloride, polystyrene, and engineering thermoplastics, metals such as galvanized steel, aluminum, copper, or the like, materials such as asbestos or cellulose, or alloys of thermoplastic materials, such as alloys of polyvinylchloride with other thermoplastic materials, composite materials such as fibrous cellulosic stock impregnated with a thermoplastic resin, or the like. The presently preferred type of material is a synthetic polymer, and specifically, polyvinylchloride.

Examples of other resins and engineering resins which may be used include acetals, nylons, polyphenylene oxides, polycarbonates, polyether sulfones, polyaryl sulfones, polyethylene terephthalates, polyetherketones, polypropylenes, polysilicones, polyphenylene sulfides, polyionomers, polyepoxies, polyvinylidene halides, and the like. As will be recognized by those skilled in the art, the choice of a particular material is dictated by the application conditions.

The individual contact sheets of the contact body may be manufactured by any conventional technique which is appropriate for the material selected to make the sheet. For example, when the individual sheets of the contact body are to be manufactured from flat stock material of a thermoplastic polymeric resin such as unplasticized polyvinylchloride, the individual contact body sheets may be thermally formed by a process such as pressure forming, vacuum forming, molding, hot stamping, or the like.

With primary reference to FIG. 1, but also with reference to FIGS. 2 and 3, each of the sheets 12 through 20 have a front face 22, which for the purposes of illustration, was arbitrarily designated to be the face visible in FIG. 1, and a rear face 24 (best illustrated in FIGS. 2 and 3), the rear face being represented by the reverse side of the drawing sheet for FIG. 1. Each sheet also has a top edge 26 and a bottom edge 28. As used herein, the term "width" of a sheet means the width of sheet 12 extending from the left to the right in FIG. 1. Each sheet also has a major plane which is designated as the plane extending for the width of the sheet between the top and bottom edges. Each sheet also has a minor plane perpendicular to the major plane which, for purposes of explanation, would extend into and out of the plane of paper forming the drawing sheet for FIG. 1

The sheets used to make contact body 10 are corrugated throughout their width and height with a plurality of corrugations 30. For most or all of the height of the sheet, the corrugations 30, or at least the major portion of corrugations 30 are angled with respect to the horizontal to provide for effective flow of liquid and gas through the contact body and effective contact of the gas and liquid on and between the sheets. Although corrugations 30 may be formed at any given angle throughout most or all of the height of the sheet depending upon the intended use of the contact body, the preferred angle is about 50° to about 70° with respect to the horizontal, and presently, the most preferred angle is about 59° to the horizontal.

As illustrated in FIG. 1, in a presently preferred embodiment of the invention, the corrugations are angled throughout most of the height of the sheet, except for a top portion 32 of the corrugations and a bottom portion 34 of the corrugations. Both the top portion 32 and bottom portion 34 of corrugations 30 are angled with respect to the major portion of the corrugations throughout most of the height of the sheets, although this is not an essential requirement. Thus, as illustrated best in FIG. 1, top portion corrugations 32 have axes which are perpendicular to the horizontal. Likewise, bottom portion corrugations 34 also have axes which are perpendicular to the horizontal. It is preferred for the manufacture and structural performance of the present invention that the top portion corrugations 32 and bottom portion corrugations 34 have axes which are perpendicular to the horizontal, at least when contact body 10 is used as a wet deck fill in a countercurrent evaporative heat exchanger. By providing the sheets 12 with top portion corrugations 32 and bottom portions corrugations 34 having axes which are perpendicular to the horizontal, manufacture of the sheets is enhanced by the use of standard forming and cutting tooling. This arrangement enhances structural performance by providing large vertical bonding areas between the sheets at the top and bottom portion corrugations 32 and 34, respectively.

Figure 4:
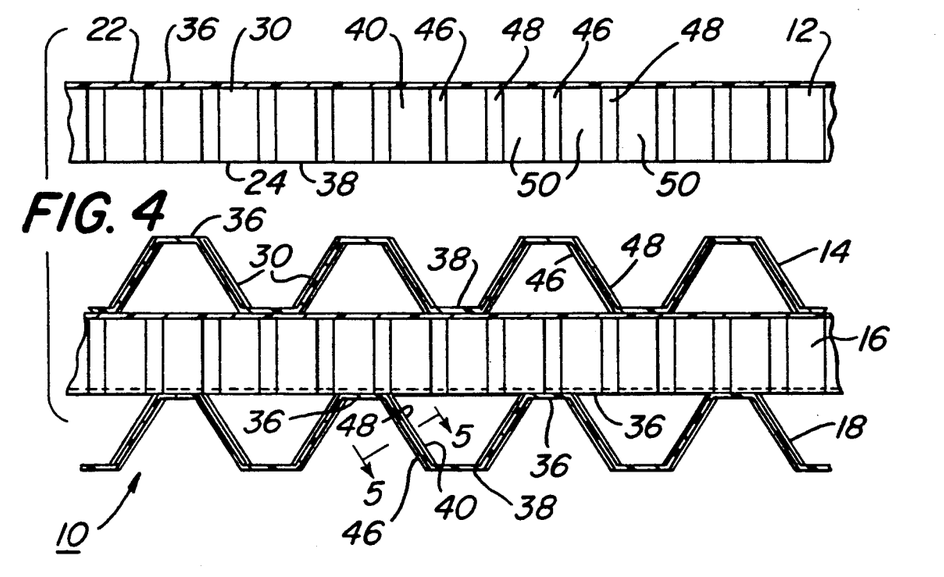
FIG. 4 is a cross-sectional view of a portion of a contact body according to the present invention, taken along lines 4—4 of FIG. 1, in which only four of many sheets typically comprising the contact body are illustrated, the topmost sheet in the drawing being illustrated in an exploded view for purposes of clarification.

Each of the corrugations 30 comprises a peak 36 and a valley 38, as best illustrated in FIGS. 2 through 4. It is preferred, but not essential, that the peaks and valleys be flattened, as illustrated, primarily to provide for more certain orientation and assembly of the sheets into contact bodies. Adjacent peaks and valleys are connected by angled walls. Thus, for example, with reference to FIG. 3, with respect to peak 36 of sheet 12, on the left-hand side (corresponding to a downwardly extending wall in the orientation of FIG. 1), the corrugation includes an angled wall 40 connecting peak 36 to valley 38. On the right-hand side of the same peak 36, as illustrated in FIG. 3, an angled wall 42 connects peak 36 to valley 38. Since the designation "peak" for peak 36 and "valley" for valley 38 depends upon a viewer's reference point, the generic term "apex" (or the plural "apices") will be used to designate either of peak 36 or valley 38. This generic term is used because the peak of one sheet becomes a valley when that sheet is rotated 180° around a vertical axis and becomes part of an assembly to form a contact body. Nevertheless, front face 22 of each sheet will be deemed to be the face illustrated as facing the viewer in FIG. 1, even if the sheet is rotated such that front face 22 is away from the viewer.

Contact body 10 may be assembled from a plurality of substantially identical sheets in contact with each other. The assembly may occur in a manufacturing plant or at the site where the contact body is to be used. Since the sheets used to make the contact body are substantially identical, it is not necessary to describe each of sheets 12, 14, 16, 18 and 20. Also since the sheets are identical, they nest or stack with each other when aligned such that front face 22 of one sheet, such as sheet 14, is in contact with rear face 24 of the next adjacent sheet, for example, sheet 12 (not shown). However, in use, to form contact body 10, every other sheet is rotated 180° around a vertical axis in front face-to-front face and rear face-to-rear face orientation with respect to adjacent sheets.

As best illustrated in FIG. 2, adjacent sheets of the contact body are arranged such that front face 22 of one sheet, for example, sheet 14, is in contact with front face 22 of the next adjacent sheet, such as sheet 16. Rear face 24 of the one sheet, again for example, sheet 14, is in contact with the original rear face 24 of the opposed, next adjacent sheet, for example, sheet 12. By way of further clarification, with particular reference to FIG. 3, because the sheets are in the front face-to-front face and rear face-to-rear face orientation, the valleys 38 of adjacent sheets 12 and 14 contact each other, as do peaks 36 of adjacent sheets 14 and 16.

When assembled, the major portions of corrugations 30 extending for most or all of the height of the sheet at an oblique angle cross the corrugations of an adjacent sheet at an oblique angle with their apices in contact with each. Thus, by way of example with respect to FIGS. 1 and 2, the major portions of corrugations 30 of front sheet 12 extend diagonally downwardly from the upper left toward the lower right of the sheet. The next adjacent sheet, such as sheet 14, would have corrugations extending diagonally downwardly from the upper right to the lower left. This alternating pattern is repeated for each of the sheets forming contact body 10.

In the illustrated presently preferred embodiment, the flattened apices of top portion 32 and bottom portion 34 of the corrugations of adjacent sheets are in contact with each other substantially throughout their area in the major plane of the sheets. Thus, when assembled, as illustrated in FIG. 2, and when contact body 10 is viewed from the bottom, bottom edge 28 forms a regular, ordered pattern, in particular with the illustrated embodiment, a generally hexagonal honeycomb pattern. Likewise, when viewed from the top, top edge 26 also forms a regular, ordered pattern, namely a hexagonal honeycomb pattern. A somewhat skewed hexagonal pattern is also formed by the side edges taken along a minor plane of the contact body, such as a plane along the right-hand side of FIG. 1. This plane would correspond generally to lines 3—3 of FIG. 2 and would produce the generally hexagonal honeycomb pattern illustrated in FIG. 3.

In embodiments in which the angled corrugations 30 extend completely to the top and bottom edges of the contact sheet that are assembled to form a contact body, the top and bottom portions of adjacent sheets will be in contact with each other substantially completely along the width of each apex at the respective top and bottom edges of the sheets. A regular, ordered pattern will still exist when the contact body is viewed from the top or bottom, although the geometric shapes formed by the contacting portions at the top and bottom edges may be somewhat skewed, rather than the generally regular shapes as illustrated. This will be particularly true along the bottom edge of the contact body where adjacent sheets will have been cut at an oblique angle as referred to hereinafter.

It is essential, particularly when contact body 10 is used as wet deck fill in an evaporative heat exchanger, and more particularly, a countercurrent evaporative heat exchanger, that bottom portion 34 of the corrugations be cut at an angle X as best illustrated in FIG. 3, which is oriented such that the left-hand side of the FIG. represents the bottom of contact body 10. An angled saw or other cutting means makes a cut or beveled edge 52 along the entire width of each sheet. Angle X is an oblique angle. The preferred angle X is about 30° to about 65° with respect to the major plane of the sheet, and presently, the most preferred angle X is about 45°. Because beveled edge 52 extends across the angled walls of the corrugations of bottom portion 34 of the sheets, when viewed from the front, bottom portion 34 of the sheets has a serrated appearance comprising a plurality of peaks 54 and valleys 56.

FIG. 3, the cross-sectional view of a portion of contact body 10 along the minor plane described above, illustrates how the sheets are oriented with respect to each other, such that beveled edges 52 form outwardly (or downwardly, in use) extending points 58 and inwardly (or upwardly, in use) extending points 60. Outwardly extending points 58 correspond to valleys 56 of the bottom edge and inwardly extending points 60 correspond to peaks 54 of the bottom edge. Because of the alignment of the adjacent sheets as illustrated in FIG. 3, the peaks 54 and valleys 56 of bottom portion 34 of all of the sheets forming contact body 10 are aligned, such that in a front elevation view as in FIG. 1, the bottom surface of contact body 10 has the indicated serrated appearance.

The importance of the beveled edge 52 and the regular, ordered pattern of adjacent peaks and valleys of bottom portion 34 is that liquid drainage is concentrated in two planes, namely, the major plane and the minor plane of the contact body as described above. Thus, liquid drains from peaks 54 to valleys 56 in the major plane illustrated in FIG. 1, as well as from inwardly extending points 60 to outwardly extending points 58 of the minor plane as illustrated in FIG. 3. The advantage of such drainage from two planes is that at the bottom of the contact body, the flow of water or other liquid is collected and concentrated from water draining from the entire height of the sheet for discharge off of the outwardly extending points 58. Moreover, with wet deck fill of the present invention, water collection is along parallel planes down the height of the sheet which helps to concentrate and drain water in the two planes at specifically ordered points as discussed above, rather than along a planar bottom surface or at random points as in prior art arrangements. All of the drainage tips at the bottom of the contact bodies of the present invention are equidistant from one another and at the maximum possible spacing from one another, providing a maximum bottom open area for unobstructed air flow. This two-dimensional drainage from ordered, equidistant, maximally spaced points is critical to the improved thermal performance of the contact body of the present invention by preventing "damming," water film blockages of the air passageways.

In a cooling tower, and particularly a countercurrent cooling tower, the bottom air entrance portion of the wet deck is characterized by extreme turbulence with high velocity air contacting significant water flow draining from the wet deck. The air stirs the water and attempts to drive the draining water into the wet deck. If the draining water is blown back into the wet deck and bridges the opening of the channels formed by corrugations of adjacent sheets within the contact body, a water film blockage or "dam" will form. Water will build up inside the channels until its hydrostatic pressure overcomes the air pressure suspending it. The results are lost fan horsepower, increased pressure drop and ultimately, lost thermal performance. "Damming" is the factor which limits cooling tower performance at high water loads and high air velocity and which limits the height and width of the major corrugations, thus surface area per cubic measure of wet deck fill. Prior art arrangements include arrangements in which the bottom portion of the sheets are beveled, but the sheets are not oriented in a regular, ordered pattern when viewed from the bottom, as well as those prior art arrangements in which the adjacent sheets form a regular, ordered pattern when viewed from the bottom, but where the bottom portion is not beveled. Water drainage from prior art arrangements is then concentrated along planar bottom surfaces or at random points and is prone to localized "damming" because of the nature of water to drain in films from planar surfaces or the proximity of certain adjacent drainage streams in a randomly ordered wet deck creates a turbulent flow condition in which the draining water is easily blown back into the wet deck by high velocity air. Comparing the present invention to the same amount of surface area of wet decks make using prior art contact bodies at equal air flow conditions shows equivalent thermal performance and surprisingly lower pressure drop, especially at high water loads and high air velocity, which is attributable to the enhanced bottom treatment of the present invention.

Figure 5:
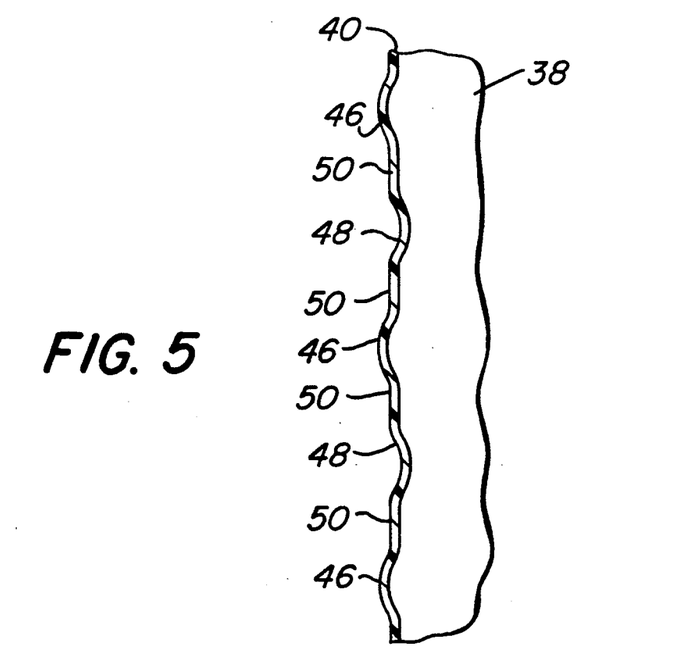
FIG. 5 is a cross-sectional view of a portion of one of the angled walls forming a corrugation of a sheet used to make the contact body according to the present invention, taken along lines 5—5 of FIG. 4, showing the transverse concave and convex ribs formed in an angled wall of a corrugation.

To obtain even better thermal performance when contact bodies 10 are used as wet deck fill in a parallel flow, crosscurrent or countercurrent evaporative heat exchanger, it is preferred that the angled walls connecting the apices of the corrugations have formed in them alternating concave ribs 46 and convex ribs 48. These ribs are best illustrated in FIGS. 4 and 5 where, for example, the ribs are formed in angled wall 40. As shown in these FIGS., the ribs extend generally transverse to the longitudinal axis of the ribs and extend entirely from peak 36 to the valley 38 joined by the angled wall 40. Concave ribs 46 are separated from convex ribs 48 by generally planar portions 50 of angled wall 40. As best illustrated in FIG. 1, within any given corrugation 30, be it considered a peak or a valley, the concave and convex ribs 46 and 48 on adjacent angled walls are not directly opposite each other. As shown in FIG. 1, concave rib 46 is not aligned with concave rib 46' on the adjacent angled wall. Likewise, convex rib 48 is offset from convex rib 48' on the adjacent angled wall.

The ribs 46 and 48 each preferably should have a nominal width of about 0.06 inch to about 0.20 inch, and more preferably, about 0.13 inch, a nominal depth or protrusion from the generally planar portions 50 of about 0.01 inch to about 0.03 inch, and more preferably, about 0.02 inch, and preferably should be spaced apart by a nominal distance of about 0.21 inch to about 0.50 inch, and more preferably, about 0.30 inch, based on the center of adjacent ribs.

The provision of alternating concave and convex ribs along the angled walls and extending from peak to valley as illustrated and described herein produces a generally serpentine flow path of fluids along the axis of the corrugations. By providing both concave and convex ribs, liquid is caused to flow more completely over substantially the entire front face 22 and rear face 24 of each sheet, as a result of the serpentine fluid flow pattern. This provides for substantially uniform flow areas on opposite faces of each contact sheet. Moreover, because ribs 46 and 48 extend from peak to valley, the ribs prevent channeling of the liquid in the corners of the sheet where the angled walls meet the apices. Better mixing of the gas and liquid within the contact body occurs, resulting in enhanced thermal performance.

The sheets may be bonded to each other by any suitable means, such as by melt bonding, ultrasonic bonding, radio frequency bonding, adhesive bonding or solvent bonding, etc. If desired, the sheets can be mechanically fastened together, as well. The presently preferred form of bonding is a melt bond, such that portions of adjacent sheets which contact each other are melt bonded together at several discrete locations.

The contact bodies 10 according to the present invention used as wet deck fill in countercurrent evaporative heat exchangers have surprisingly lower pressure drop for the air or other gas flowing upwardly through the contact body for any given fan system compared to prior art wet deck fill. This allows the wet deck fill to perform at higher loading of water per unit of top plan area and allows the wet deck fill to be stacked higher within the heat exchanger liquid-gas contact duct while still using the same fan system to move the air or other gas through the fill. Alternatively, for the same amount and arrangement of fill based on prior art designs, the wet deck fill of the present invention passes the same amount of air or other gas at a lower horsepower, allowing for more economical and energy efficient thermal performance. These advantages and benefits of the present invention are in addition to the others mentioned above with respect to the structural integrity, stackability and ease of installation.

The present invention may be embodied in other specific forms without departing from the spirit or essential attributes thereof and, accordingly, reference should be made to the appended claims, rather than to the foregoing specification as indicating the scope of the invention.

We claim:

1. A gas and liquid contact body comprising a plurality of parallel and generally vertically oriented gas and liquid contact sheets, each sheet having a front face and a rear face, a top edge and a bottom edge, a major plane corresponding to the width and height of the sheet, a plurality of substantially parallel corrugations having apices alternating on the front and rear faces of the sheets, the apices being joined together by angled walls, the corrugations extending at an oblique angle to the horizontal, the sheet having a bottom portion of the corrugations adjacent the bottom edge, the bottom portion being cut on an oblique angle along the width of the sheet to form a beveled bottom edge, such that the beveled bottom edge has peaks and valleys along the width of the sheet when viewed from the front face or the rear face, adjacent sheets of the contact body being oriented such that the front face of one sheet is in contact with the front face of the next adjacent sheet and the rear face of the one sheet is adjacent to the rear face of the opposed next adjacent sheet and such that the corrugations of adjacent sheets cross at intersections of their apices, and the apices of the corrugations of the bottom portions of adjacent sheets are in contact with each other substantially completely along the width of each apex at the bottom edges of the sheets, whereby the bottom edges of the sheets comprising the contact body form regular, ordered patterns when viewed from the bottom of the contact body.

2. A contact body according to claim 1 further comprising a top portion of the corrugations adjacent the top edge of the sheet, and wherein each of the top and bottom portions has an axis perpendicular to the horizontal, such t hat the top and bottom portions of adjacent sheets are in contact completely along the width of each apex of the top and bottom edges of the sheet.

3. A contact body according to claim 2 wherein the apices are flattened, whereby both the top and bottom edges of the sheets comprising the contact body form generally hexagonal honeycomb patterns when viewed from the top and bottom, respectively, of the contact body.

4. A contact body according to claim 1 wherein the apices are flattened.

5. A contact body according to claim 1 wherein the oblique angle of t he corrugations is about 50° to about 70° with respect to the horizontal.

6. A contact body according to claim 1 wherein the oblique angle of the beveled bottom portion of the corrugations of each sheet is about 30° to about 65° with respect to the major plane.

7. A contact body according to claim 1 further comprising a plurality of alternating concave and convex ribs formed in the walls of the corrugations and generally transverse to the axis of the corrugations.

8. A contact body according to claim 7 wherein the alternating concave and convex ribs are separated from each other by generally planar portions of the wall of the corrugations.

9. A contact body according to claim 8 wherein the apices are flattened.

10. A gas and liquid contact body comprising a plurality of parallel and generally vertically oriented gas and liquid contact sheets,
   each sheet having a front face and a rear face, a top edge and a bottom edge, a major plane corresponding to the width and height of the sheet, a plurality of substantially parallel corrugations having apices alternating on the front and rear faces of the sheets, the apices being joined together by angled walls, the corrugations extending at an oblique angle to the horizontal, the walls of the corrugations containing a plurality of alternating concave and convex ribs extending completely from one apex to an opposing apex joined by the wall, the alternating ribs being generally transverse to the longitudinal axis of the corrugation and being separated from each other by generally planar portions of the wall of the corrugation, the sheet having a bottom portion of the corrugations adjacent the bottom edge, the bottom portion being cut on an oblique angle along the width of the sheet to form a beveled bottom edge, such that the beveled bottom edge has peaks and valleys along the width of the sheet when viewed from the front face or the rear face,
   adjacent sheets of the contact body being oriented such that the front face of one sheet is in contact with the front face of the next adjacent sheet and the rear face of the one sheet is adjacent to the rear face of the opposed next adjacent sheet and such that the corrugations of adjacent sheets cross at intersections of their apices, and the apices of the corrugations of the bottom portions of adjacent sheets are in contact with each other substantially completely along the width of each apex at the bottom edges of the sheets, whereby the bottom edges of the sheets comprising the contact body form regular, ordered patterns when viewed from the bottom, of the contact body.

11. A contact body according to claim 10 further comprising a top portion of the corrugations adjacent the top edge of the sheet, and wherein each of the top and bottom portions has an axis perpendicular to the horizontal, such that the top and bottom portions of adjacent sheets are in contact completely along the width of each apex of the top and bottom edges of the sheet.

12. A contact body according to claim 11 wherein the apices are flattened, whereby both the top and bottom edges of the sheets comprising the contact body form generally hexagonal honeycomb patterns when viewed from the top and bottom, respectively, of the contact body.

13. A contact body according to claim 10 wherein the apices are flattened.

14. A contact body according to claim 10 wherein the oblique angle of the corrugations is about 50° to about 70° with respect to the horizontal.

15. A contact body according to claim 10 wherein the oblique angle of the beveled bottom portion of the corrugations of each sheet is about 30° to about 65° to the major plane.

16. A gas and liquid contact sheet according to claim 10 wherein the contact sheet has substantially uniform flow area on opposite faces of the sheet.

17. A contact sheet according to claim 10 wherein each of the ribs has a width of about 0.06 inch to about 0.20 inch.

18. A contact sheet according to claim 10 wherein the concave ribs have a depth of about 0.01 inch to about 0.03 inch and the convex ribs protrude about 0.01 inch to about 0.03 inch from the generally planar portions of the walls of the corrugations.

19. A contact sheet according to claim 10 wherein the ribs are spaced from each other by the generally planar portions of the walls of the corrugations by a distance of about 0.21 inch to about 0.50 inch based on the center of adjacent ribs.

* * * * *